(12) United States Patent
Meacci et al.

(10) Patent No.: US 9,565,636 B2
(45) Date of Patent: *Feb. 7, 2017

(54) POWER MANAGEMENT SYSTEM AND METHOD FOR VEHICLE LOCATING UNIT

(71) Applicant: LoJack Corporation, Canton, MA (US)

(72) Inventors: Fabio Meacci, Cambridge, MA (US); James A. Justice, Bellingham, MA (US); Jesse L. Rhodes, Franklin, MA (US); Michael Goodwin, North Andover, MA (US)

(73) Assignee: LoJack Corporation, Canton, MA (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/093,982

(22) Filed: Dec. 2, 2013

(65) Prior Publication Data

US 2014/0105089 A1    Apr. 17, 2014

Related U.S. Application Data

(63) Continuation of application No. 12/589,498, filed on Oct. 23, 2009, now Pat. No. 8,618,957.

(51) Int. Cl.
*H04W 52/02* (2009.01)
*G08G 1/00* (2006.01)

(52) U.S. Cl.
CPC .......... *H04W 52/0235* (2013.01); *G08G 1/20* (2013.01); *H04W 52/0229* (2013.01)

(58) Field of Classification Search
CPC ................................ H04W 52/0235
USPC .......................................... 370/311
See application file for complete search history.

(56) References Cited

U.S. PATENT DOCUMENTS

| | | | |
|---|---|---|---|
| 4,177,466 A | 12/1979 | Reagan | |
| 4,818,988 A | 4/1989 | Cooperman et al. | |
| 4,818,998 A | 4/1989 | Apsell et al. | |
| 4,908,609 A | 3/1990 | Stroomer | |
| 5,392,287 A * | 2/1995 | Tiedemann et al. | 370/311 |
| 5,526,357 A | 6/1996 | Jandrell | |
| 5,704,008 A | 12/1997 | Duvall, Jr. | |
| 5,789,098 A | 8/1998 | Pinder | |
| 5,917,423 A | 6/1999 | Duvall | |
| 5,940,431 A | 8/1999 | Haartsen et al. | |
| 6,058,289 A | 5/2000 | Gardner et al. | |
| 6,198,919 B1 | 3/2001 | Buytaert et al. | |
| 6,229,988 B1 * | 5/2001 | Stapefeld et al. | 340/7.35 |
| 6,289,227 B1 | 9/2001 | Shi | |
| 6,317,049 B1 | 11/2001 | Toubia et al. | |
| 6,522,698 B1 | 2/2003 | Irving et al. | |
| 6,535,116 B1 * | 3/2003 | Zhou | 340/447 |
| 6,564,074 B2 | 5/2003 | Romans | |
| 6,647,270 B1 | 11/2003 | Himmelstein | |

(Continued)

*Primary Examiner* — Rasheed Gidado
(74) *Attorney, Agent, or Firm* — KPPB LLP

(57) ABSTRACT

Improved power management for a vehicle locating unit is achieved by receiving a transmission from a communication source, each transmission including at least one message frame having a data field and at least one auxiliary field; entering a wake mode upon indexing the assigned message frame of the receiver in the transmission; matching the pattern of bits of at least one auxiliary field of the indexed frame with one or more stored patterns of bits expected for that auxiliary field; and returning to the sleep mode as soon as a mismatch is determined or processing the message if no mismatch occurs.

16 Claims, 7 Drawing Sheets

(56) References Cited

U.S. PATENT DOCUMENTS

| | | |
|---|---|---|
| 6,665,613 B2 | 12/2003 | Duvall |
| 6,799,030 B2 | 9/2004 | Barber et al. |
| 6,888,495 B2 | 5/2005 | Flick |
| 6,978,149 B1 | 12/2005 | Morelli et al. |
| 7,030,731 B2 | 4/2006 | Lastinger et al. |
| 7,034,656 B2 | 4/2006 | Buchner |
| 7,149,623 B2 | 12/2006 | Flick |
| 7,269,145 B2 | 9/2007 | Koo et al. |
| 7,378,964 B1 * | 5/2008 | Amir et al. ............... 340/539.32 |
| 7,511,606 B2 | 3/2009 | Romano et al. |
| 7,525,289 B2 | 4/2009 | Janik et al. |
| 7,573,381 B2 | 8/2009 | Karr |
| 7,574,192 B2 | 8/2009 | Gudmundsson |
| 7,592,918 B2 | 9/2009 | Karr |
| 7,593,711 B2 | 9/2009 | Romano et al. |
| 7,768,234 B2 | 8/2010 | Janik et al. |
| 8,036,152 B2 | 10/2011 | Brown et al. |
| 8,150,686 B2 * | 4/2012 | Pietsch et al. ................ 704/227 |
| 8,223,783 B2 * | 7/2012 | Shorty .................... H04L 12/10 |
| | | 370/406 |
| 2004/0039504 A1 * | 2/2004 | Coffee et al. .................. 701/35 |
| 2007/0103271 A1 * | 5/2007 | King ....................... B60R 25/24 |
| | | 340/5.72 |
| 2010/0240302 A1 * | 9/2010 | Buczkiewicz ......... H04B 1/034 |
| | | 455/11.1 |

* cited by examiner

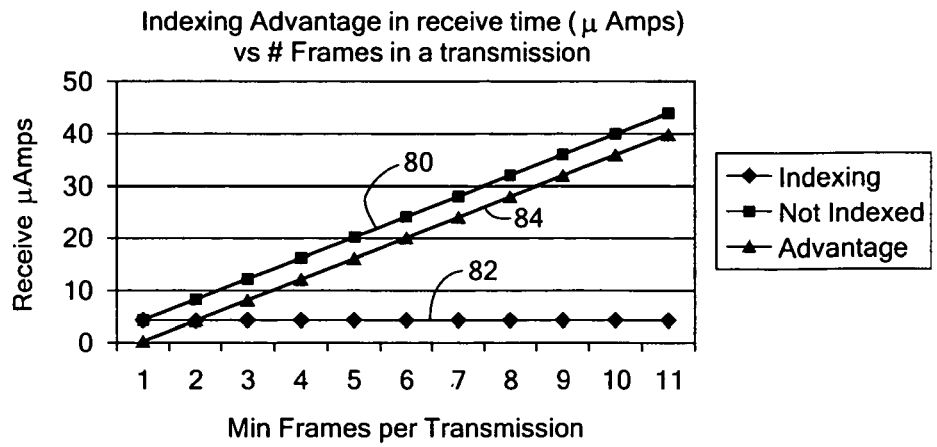
FIG. 3
Bit Matching
| | | |
|---|---|---|
| Bit order | 1 2 3 4 5 6 7 8 | 90 → 92 |
| Tower Transmission bits = | 1 1 0 0 1 0 1 0 | |
| Stored Memory bits Pattern A | 0 0 1 0 0 0 1 1 | No match on bit 1 |
| Stored Memory bits Pattern B | 1 0 1 0 0 0 1 1 | No match on bit 2 |
| Stored Memory bits Pattern C | 1 1 0 0 0 0 1 1 | No match on bit 5 |
| Stored Memory bits Pattern D | 1 1 1 0 0 0 1 1 | No match on bit 3 |
FIG. 4
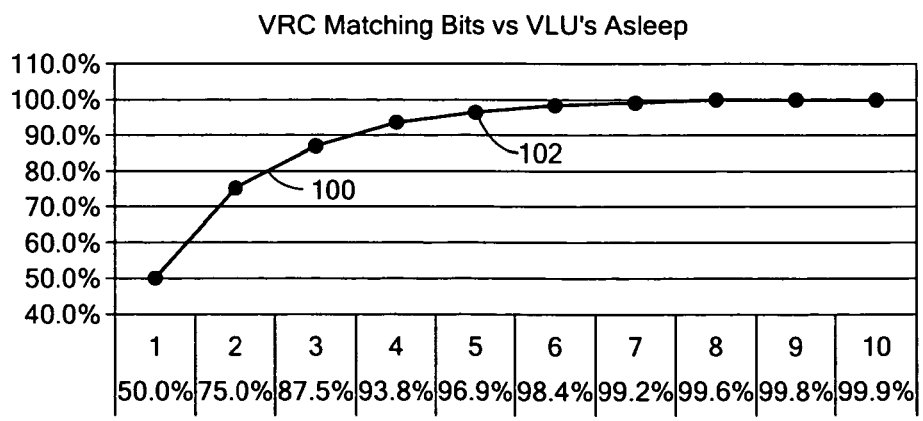
FIG. 5

POWER MANAGEMENT SYSTEM AND METHOD FOR VEHICLE LOCATING UNIT

RELATED APPLICATION

This application is a continuation of U.S. application Ser. No. 12/589,498, filed Oct. 23, 2009, the entirety of which is hereby incorporated by reference.

FIELD OF THE INVENTION

This invention relates to vehicle recovery systems and, in particular, to a vehicle locating unit of such a system with an improved power management system and method.

BACKGROUND OF THE INVENTION

The applicant's successful and popular vehicle recovery system sold under the trademark LoJack® includes a small electronic vehicle locating unit (VLU) with a transponder hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Criminal Information Center. The entries of that database comprise the VIN number of the customer's vehicle and an identification code assigned to the customer's VLU.

When a LoJack® product customer reports that her vehicle has been stolen, the YIN number of the vehicle is reported to a law enforcement center for entry into a database of stolen vehicles. The network center includes software that interfaces with the database of the law enforcement center to compare the VIN number of the stolen vehicle with the database of the network center which includes VIN numbers corresponding to VLU identification codes. When there is a match between a VIN number of a stolen vehicle and a VLU identification code, as would be the case when the stolen vehicle is equipped with a VLU, and when the center has acknowledged the vehicle has been stolen, the network center communicates with the RTUs of the various communication towers (currently there are 180 nationwide) and each tower transmits a message to activate the transponder of the particular VLU bearing the identification code.

The transponder of the VLU in the stolen vehicle is thus activated and begins transmitting the unique VLU identification code. The VTU of any law enforcement vehicles proximate the stolen vehicle receive this VLU transponder code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613 all incorporated herein by this reference.

Since the VLU unit is powered by the vehicle's battery, power management techniques must be employed in the VLU to ensure the VLU does not drain the vehicle's battery. One prior technique employed by the applicant includes programming the VLU to "wake up" and check for messages from the communication towers only periodically, e.g., every 8 seconds for 0.2 seconds. The timing of the sleep and wake-up modes was synchronized to the transmission schedule of one communication tower.

Historically, the vehicle locating unit was powered from the vehicle battery which made the vehicle locating unit vulnerable to any vagaries attendant on the vehicles own power supply and power management controls. Today, certain vehicle manufacturers have power monitoring systems that do not allow use of their vehicle power: these systems may cut off power to any circuit that appears to be drawing too much current or is on too long, for example. Thus a vehicle locating unit connected to such circuits would be subject to being arbitrarily de-powered. One solution is to provide the vehicle locating unit with its own battery but this requires enlarging the size of the vehicle locating unit making it difficult to install in small, unobtrusive areas of the vehicle or using a smaller battery which results in shorter life e.g. six months with the attendant cost and effort of servicing the vehicle every six months for example.

SUMMARY OF THE INVENTION

In accordance with various aspects of the subject invention in at least one embodiment the invention presents an improved power management system and method for a vehicle locating unit which operates independent of the vehicles own power supplies using its own battery and is capable of years of uninterrupted operation, while maintaining small size resulting in lower vulnerability to tampering and lower service requirements.

The invention results from the realization, in part, that a vehicle locating unit with improved power management can be achieved by entering a sleep mode after detecting a transmission; entering a wake mode upon indexing the assigned message frame of the receiver in the transmission; matching the pattern of bits of at least one auxiliary field of the indexed frame with one or more stored patterns of bits expected for that auxiliary field and returning to the sleep mode as soon as a mismatch is determined or processing the message if no mismatch occurs and also by switching the transmitter from a de-activated state to a slow mode state upon receipt of an activate command; switching the transmitter from the slow mode state to a second, slower mode state after a predetermined period; switching, upon receipt of a speed-up command, the transmitter from either of the slow mode state or second slow mode state to a fast mode state; and switching the transmitter from the fast mode state to the slow mode state after a predefined period.

The subject invention, however, in other embodiments, need not achieve all these objectives and the claims hereof should not be limited to structures or methods capable of achieving these objectives.

This invention features a vehicle locating unit with improved power management, the vehicle locating unit including, a receiver for receiving a transmission from a communications source, each transmission including at least one message frame having a data field and at least one auxiliary field. A power management system responsive to the receiver and configured to enter a sleep mode after detecting a transmission and enter a wake mode upon indexing the assigned message frame of the receiver in the transmission, matching the pattern of bits of at least one auxiliary field of the indexed frame with one or more stored patterns of bits expected for that auxiliary field, and either returning to the sleep mode as soon as a mismatch is determined or processing the message if no mismatch occurs.

In preferred embodiments there may be a plurality of message frames in each transmission. There may be one or more auxiliary fields in each message frame. The power management system may include a processor for controlling the wake and sleep modes. The power management system may include a memory for storing the one or more patterns of bits expected for an auxiliary field.

This invention also features an improved method of power management for a vehicle locating unit including, receiving a transmission from a communication source, each transmission including at least one message frame having a data field and at least one auxiliary field; entering a wake mode upon indexing the assigned message frame of the receiver in the transmission, matching the pattern of bits of at least one auxiliary field of the indexed frame with one or more stored patterns of bits expected for that auxiliary field and returning to the sleep mode as soon as a mismatch is determined or processing the message if no mismatch occurs.

In preferred embodiment there may be a plurality of message frames in each transmission. There may be one or more auxiliary fields in each message frame.

This invention also features a vehicle locating unit with improved power management, the vehicle locating unit including, a transmitter for transmitting reply codes, and a receiver for receiving activate commands, de-activate commands and speed-up commands. A power management system is responsive to the receiver and configured to switch the transmitter from a de-activated state to a slow mode state upon receipt of an activate command, to switch the transmitter from the slow mode state to a second, slower, slow mode state after a predetermined period; and upon receipt of a speed-up command to switch the transmitter from either of the slow mode state or second slow mode state to a fast mode state and to switch the transmitter from the fast mode state to the slow mode state after a predetermined period.

In a preferred embodiment the power management system may be further configured to switch the transmitter from the second slow mode state to a third, slower, slow mode state after a preselected period, and to switch the transmitter from the third slow mode state to the fast mode state upon receipt of a speed-up command. The power management system may be further configured to de-activate the transmitter from any of the mode states to a de-activated state upon receipt of a de-activate command.

This invention also features an improved method of power management for a vehicle locating unit having a transmitter for transmitting reply codes and a receiver for receiving activate commands, de-activate commands and speed-up commands including, switching the transmitter from a de-activate state to a slow mode state upon receipt of an activate command; switching the transmitter from the slow mode state to a second, slower mode state after a predetermined period; switching, upon receipt of a speed-up command, the transmitter from either of the slow mode state or second slow mode state to a fast mode state; and switching the transmitter from the fast mode state to the slow mode state after a predetermined period.

In preferred embodiments the method may further include switching the transmitter from the second slow mode state to a third, slower, slow mode state after a preselected period, and switching the transmitter from the third slow mode state to the fast mode state upon receipt of the speed-up command. The method may further include de-activating the transmitter from any of the mode states to a de-activated state upon receipt of a de-activate command.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 3 illustrates the advantage in receiver unit versus number of frames achieved with the power management approach of this invention;

FIG. 4 is a chart of a typical bit matching operation for an auxiliary VRC field having four stored bit patterns;

FIG. 5 illustrates the advantage in number of VLU's asleep after each matching bit comparison;

DETAILED DESCRIPTION OF THE INVENTION

Figure 1:
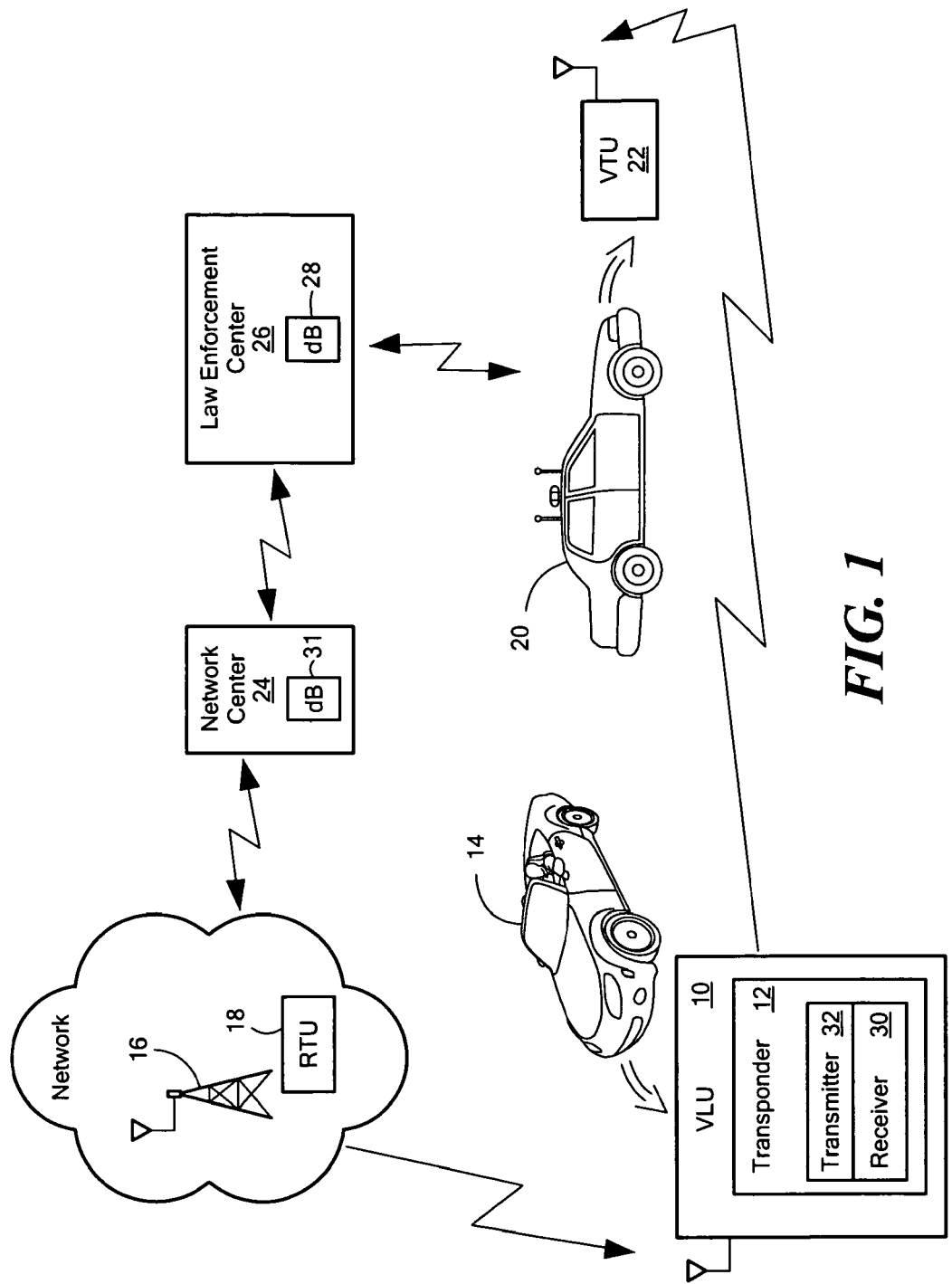
FIG. 1 is a schematic block diagram of the primary components associated with a vehicle recovery system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the background section above, the applicant's successful and popular vehicle recovery system sold under the trademark LoJack® includes a small electronic vehicle locating unit (VLU) 10, FIG. 1, with a transponder 12 hidden within a vehicle 14, a private network of communication towers 16 each with a remote transmitting unit (RTU) 18, one or more law enforcement vehicles 20 equipped with a vehicle tracking unit (VTU) 22, and network center 24. Transponder 12 includes a receiver 30 and transmitter 32.

When a LoJack® product customer reports that her vehicle has been stolen, the VIN number of the vehicle is reported to law enforcement center 26 for entry into database 28 of stolen vehicles. Network center 24 includes software that interfaces with database 28 of law enforcement center 26 to compare the VIN number of the stolen vehicle with database 31 of network center 24 which includes VIN numbers corresponding to VLU identification codes. When there is a match between a VIN number of a stolen vehicle and a VLU identification code, as would be the case when stolen vehicle 14 is equipped with VLU 10, network center 24 communicates with the RTUs 18 of the various communication towers 16 and each tower transmits a message to activate transponder 12 of VLU 10 bearing the particular identification code.

Transponder 12 of VLU 10 in stolen vehicle 14, once activated, begins transmitting a unique VLU identification code. VTU 22 of law enforcement vehicle 20 proximate stolen vehicle 14 receives this VLU transponder code and, based on signal strength and directional information, the appropriate law enforcement vehicle can take active steps to recover stolen vehicle 14.

Self powered VLU 10, FIG. 1, according to this invention has a target average current of 15 uA when running at low power. Tower 16 transmits, for example, once every 64 seconds so that VLU 10 sleeps for 63 seconds and wakes up when it expects to find the tower transmission. This technique allows VLU 10 to sleep 63 or 64 seconds out of every cycle. A transmission from the tower includes one or more message frames, as many as eleven message frames for example. When VLU 10 wakes up and finds the start of a transmission it goes back to sleep until the message frame index which is particularly assigned to this particular VLU arrives. There may be any number of message frames in a transmission. The benefits of this invention increase as the number of message frames increase. Typically there may be, for example, eleven message frames in the transmission.

Figure 2:
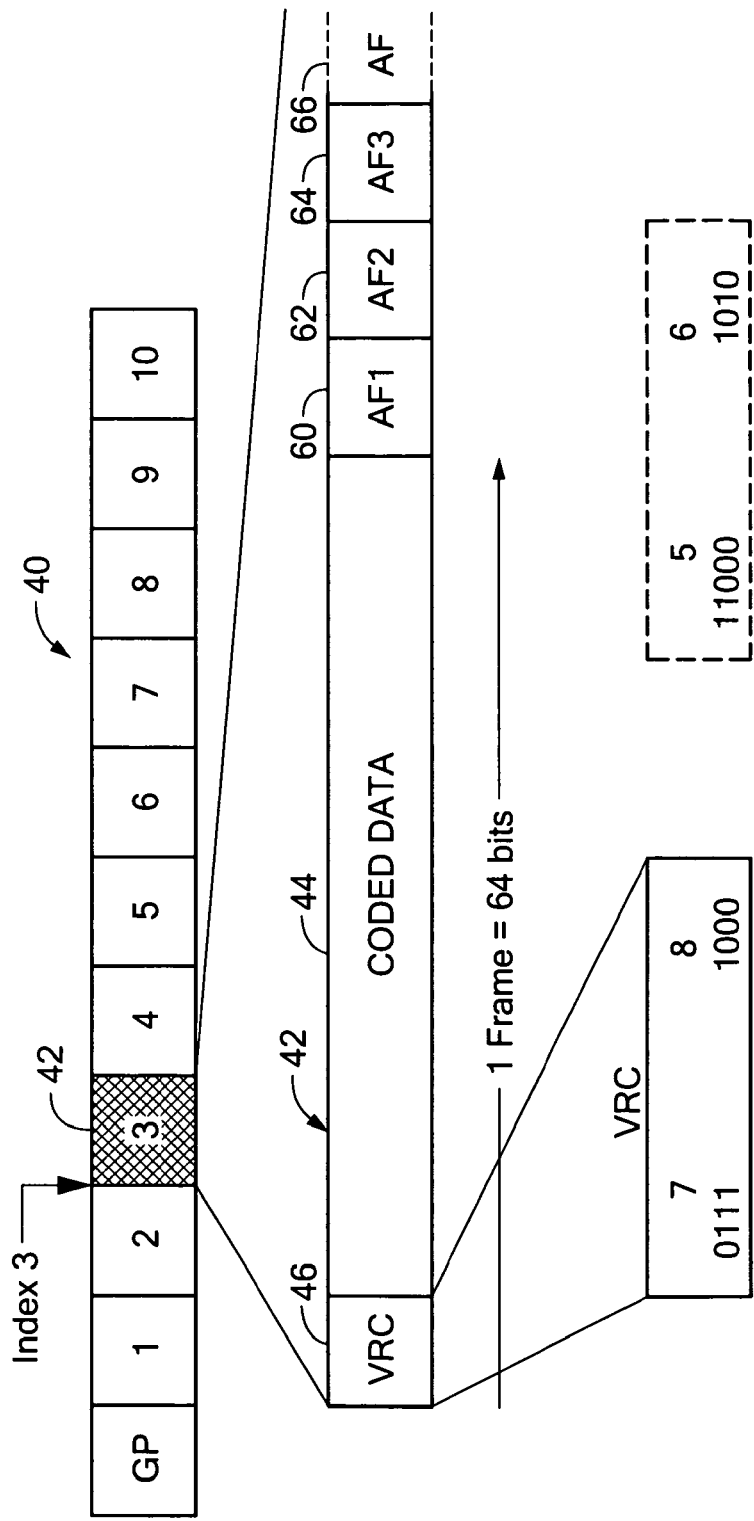
FIG. 2 is a diagram of a multi-message frame transmission and enlarged diagram showing the detected indexed message frame and auxiliary field for a particular vehicle locating unit according to this invention.

In FIG. 2 a transmission 40 includes eleven message frames labeled GP, 1, 2, 3, 4, 5, 6, 7, 8, 9 and 10. GP is a Guaranteed Packet and is typically the first frame of each transmission. Upon the arrival of message frame GP, the VLU transitions to the awake mode but then immediately goes into the sleep mode until it indexes to its assigned message frame: in this case, message frame 3. An enlarged view of message frame 3, 42 is shown as including coded data section 44 and an auxiliary section 46, (Vertical Redundancy Check (VRC)) including 64 bits in all.

The advantage of indexing according to this invention increases as the number of message frames increases in a transmission. For example, as shown in FIG. 3 where the minimum number of frames per transmission in the X axis is plotted against the receiver current in uA's in the Y axis, it is apparent that for an un-indexed system 80 the current requirement increases linearly. However, in an indexing system as shown at 82 the required current never increases regardless of how many message frames there may be per transmission and so the advantage in current saved 84 increases with the number of message frames per transmission. However, even at one message frame per transmission the advantage inheres that the system is always subject to a constant current draw as shown at 82 whether there be one or a plurality of message frames per transmission. This is so because no matter how many message frames there may be there is only one being processed.

Another technique which may be used in conjunction with indexing is bit pattern matching. In FIG. 2, there is further shown an enlarged more detailed view of the VRC auxiliary field 46. (Note that there may be a number of auxiliary fields, 60, 62, 64, and 66 in message frame 42.) Any one or more of these fields may be used in the bit pattern matching operation. For the purposes of illustration we have chosen VRC field 46 which has eight bits for this bit pattern matching operation. Further for purposes of illustration we assume that there are a number of VRC patterns that can occur in message frame 42. For example, test, activate, deactivate, speed-up, so there are four different bit patterns that may normally, properly, appear in the eight bits of VRC field 46. The bit patterns for test, activate, deactivate and speed-up are shown in FIG. 4, as Stored Memory bits pattern A, B, C, and D, respectively. The bit order of the eight bits in VRC 46 is indicated at 90 and the actual bits transmitted by the tower are shown at 92. These stored memory bits for patterns A, B, C and D are stored in memory in VLU 10. It can be seen that comparing the transmission bits to the stored memory bits of pattern A produces a mismatch on the very first bit with respect to the stored memory bits. In pattern B, there is a mismatch indicated on the second bit, pattern C on the fifth bit and pattern D on the third bit.

The advantage of matching the VRC bits or the bits of any auxiliary or specially provided field with the incoming bits to place VLU 10 in the sleep mode is shown in FIG. 5, where it can be seen that 50% of the units are already asleep after the very first mismatch on the first bits. And as indicated by the characteristic 100 in FIG. 5, by the fifth bit at 102, over 95% of the VLUs have been returned to the sleep mode at a significant power savings.

Figure 6:
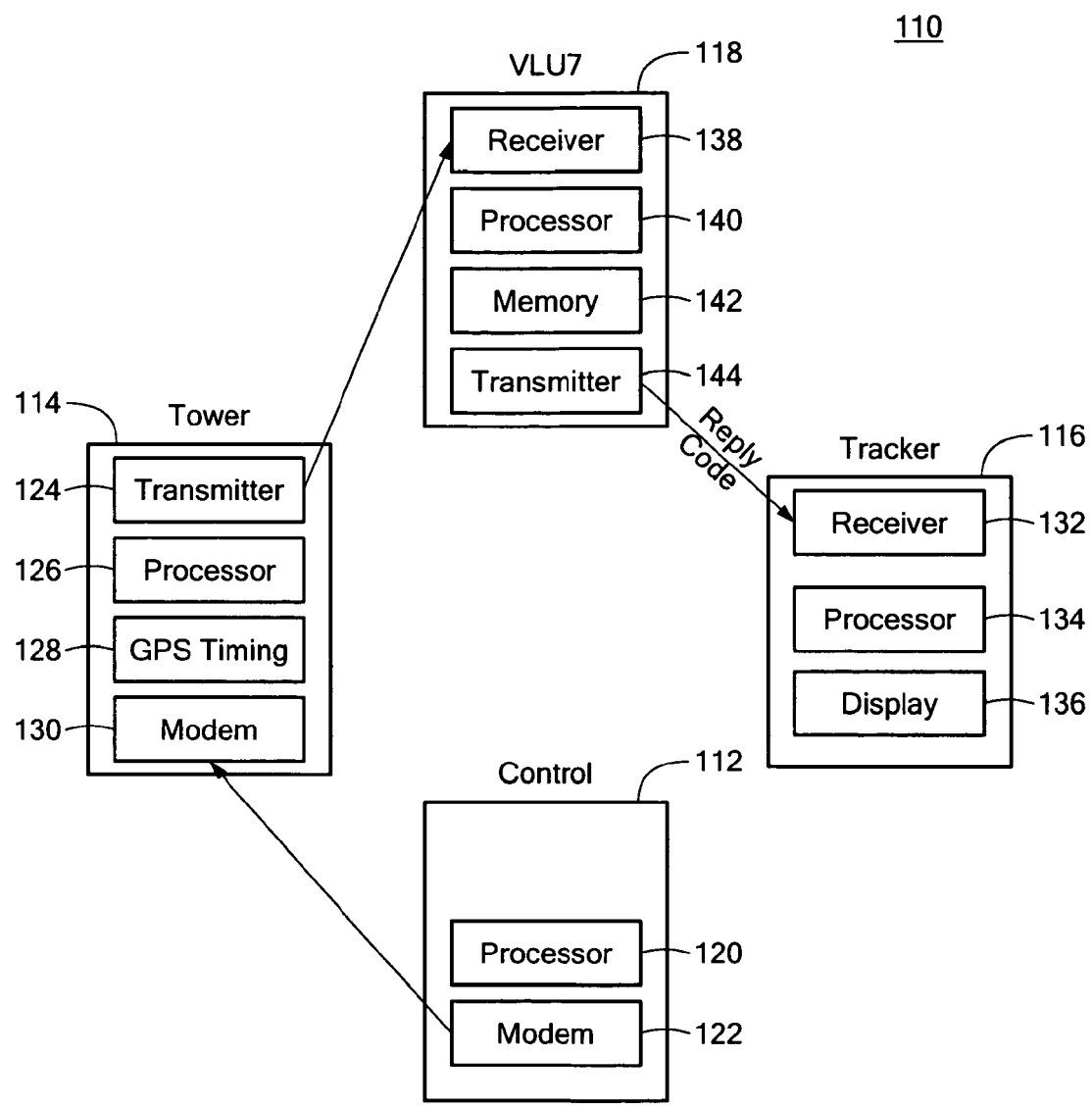
FIG. 6 is a simplified block diagram of a vehicle tracking system including a vehicle locating unit, police tracker, control and tower according to this invention.

A typical vehicle recovery system 110, FIG. 6, includes a control system 112, one or more tower systems 114, many vehicle tracking units 116, typically in police cars, and many vehicle locating units VLU's 118, located in vehicles. Control 112 typically includes a microprocessor 120 and modem 122 for communicating with tower 114, which includes a transmitter 124, micro processor 126, GPS timing circuits 128, and modem 130. VTU 116 includes a receiver 132 for receiving signals from the VLU 118 in a stolen vehicle, microprocessor 134 and typically a display 136 or readout for the officer in the tracking police vehicle to keep track of the progress. Vehicle locating unit 118 includes a receiver 138, processor 140, memory 142 and transmitter 144.

Figure 7:
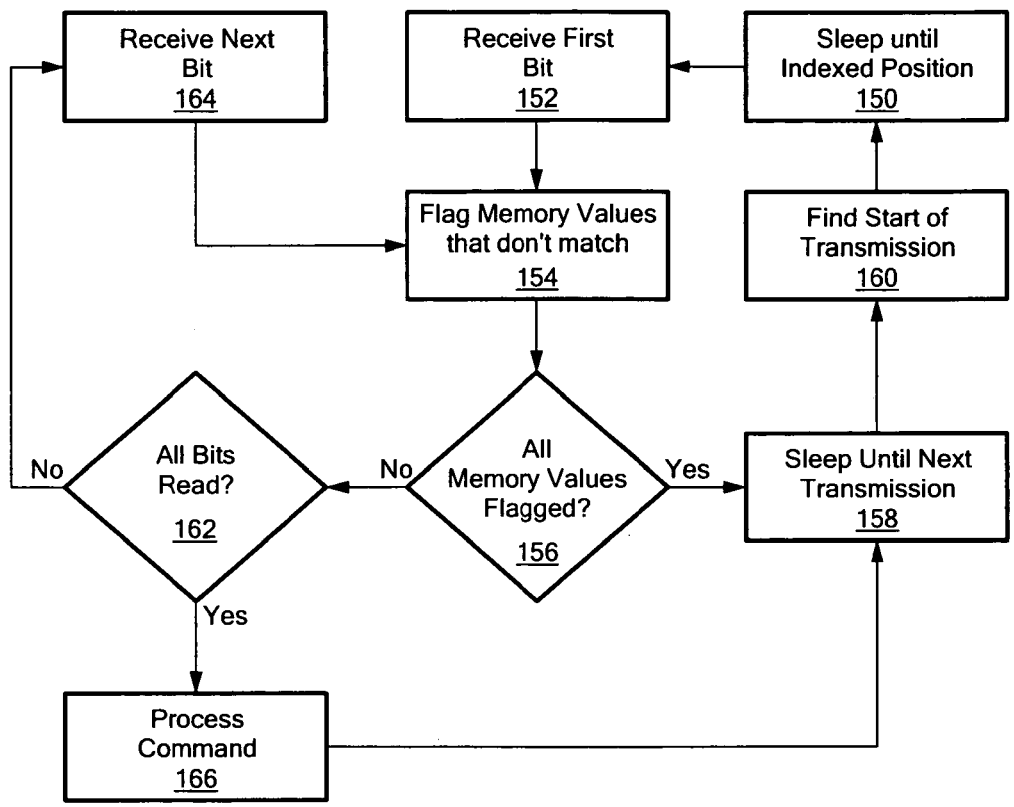
FIG. 7 is a flow chart of the bit pattern matching operation.

The bit pattern matching operation is shown in FIG. 7. The system sleeps until it reaches the index position 150; it then receives the first bit 152. If the incoming bit is a mismatch with the memory values, that is flagged, 154. If all the memory values have been flagged, 156, then the system sleeps until the next transmission, 158, and awaits the find of the start of the next transmission 160. If all the memory values have not been flagged, in step 156 query is made as to whether all the bits have been read 162. If they have not, then the system receives the next bit 164, and a mismatch memory value again sets a flag 154. If all the bits have been read and at this point no memory values have been flagged then the processing of the message frame is instituted 166.

Figure 8:
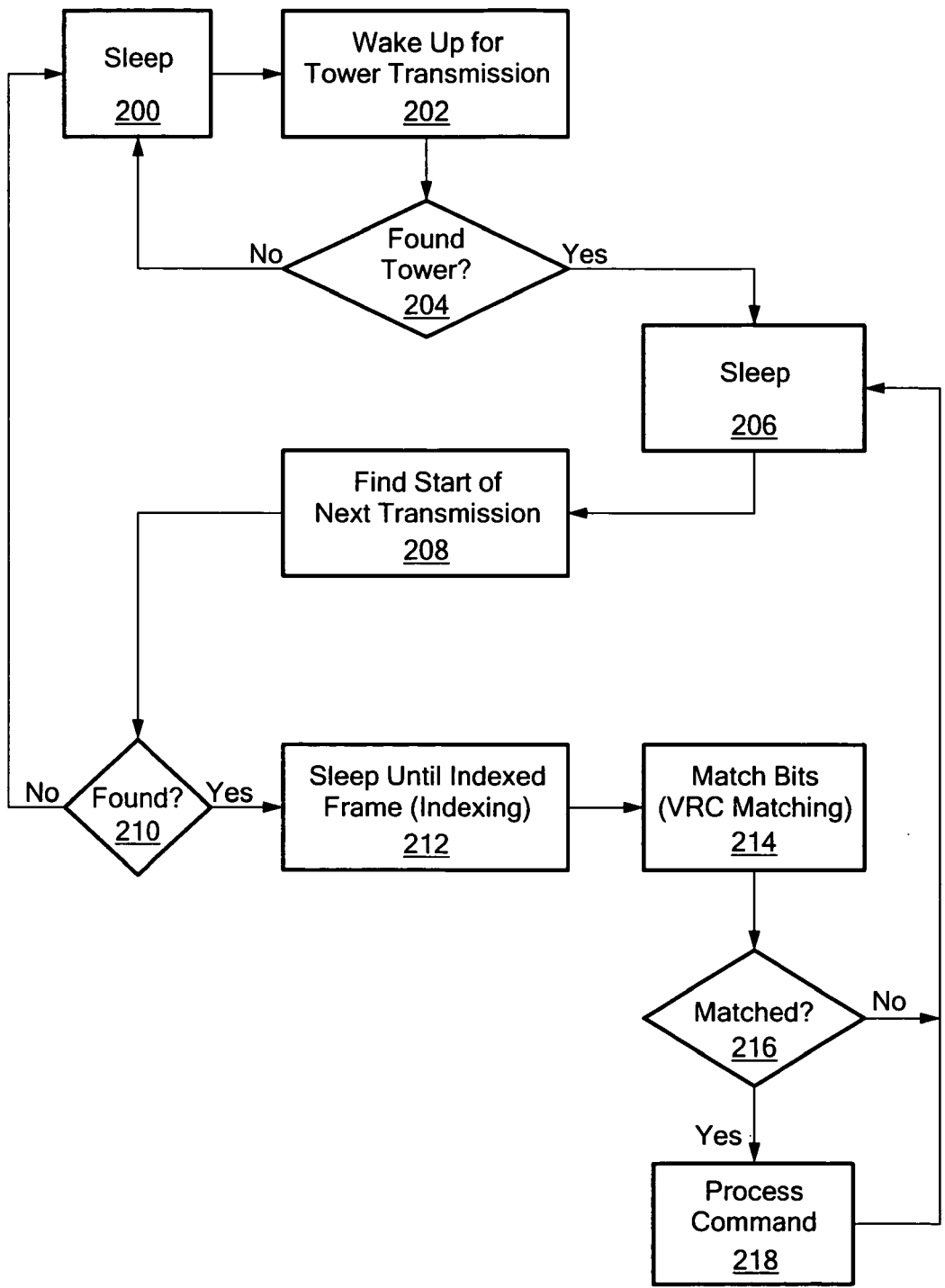
FIG. 8 is a flow chart of the indexing and bit pattern matching operations.

The implementation of the indexing and the pattern matching operations are shown in FIG. 8, where the sleeping system 200 is put into the wake mode by a wake up transmission from tower transmission 202. If a tower has not been found 204, the system goes back to sleep at 200. If the tower has been found the system goes back to sleep at 206 and it looks for the start of the next transmission 208. If the start of the next transmission is found 210, then the system goes back to sleep until the message frame assigned to this VLU is indexed at 212. Once the assigned message frame has been indexed the bit pattern matching is undertaken at 214. If there is a match at 216 then the message frame is processed at 218 after which the system goes back to sleep at 206. If there is not a match at 216 the system directly goes back to sleep at 206.

Figure 9:
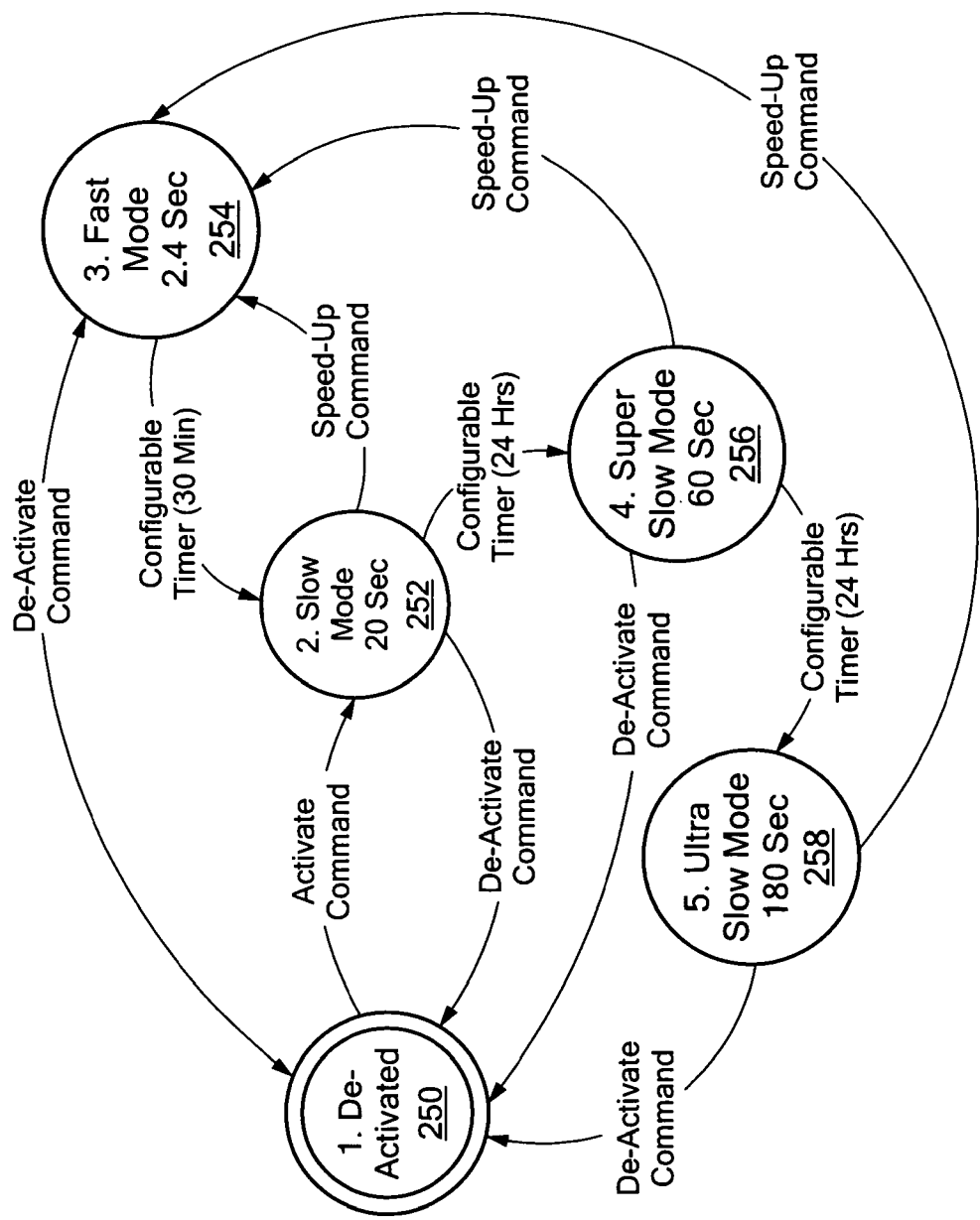
FIG. 9 is a state diagram of the operation of the transmit portion of a vehicle locating unit showing power management of this invention.

The disclosure with respect to FIGS. 2-8 primarily deals with the power management with regard to the receiver 30. There is also power saving accomplished with respect to transmitter 32. When a vehicle is out of range of a police car with a vehicle tracker unit the vehicle locating unit may go into a slower rate of transmission to conserve power. Such an improved transmitter approach is shown in FIG. 9 where two new slower states have been introduced to reduce transmit power when they are activated. The vehicle locater unit is normally in a de-activated state 250; if it receives an activate command from a tower VLU 10 the VLU will transition to a slow mode state 252 in which it transmits its reply code once every twenty seconds, for example, so it can be received by a police tracking computer in a vehicle tracking unit. If, while in the slow mode 252, a speed up command is received the system transitions to the fast mode 254 which, for example, may transmit every 2.4 seconds. If, while in the fast mode 254, the system is not de-activated by hearing its de-activation code and command as normally occurs when the police recover a stolen vehicle it will automatically revert to slow mode 252, typically using a configurable timer of, for example, 30 minutes. Similarly, operating in the slow mode 252 with the assistance of another configurable timer, if there is no de-activate command within, for example, 24 hours, the system reverts to the new super slow mode 256 which, for example, transmits every 60 seconds. If in turn super slow mode 256 is not de-activated, then with the assistance of a configurable timer within, for example, 24 hours, the super slow mode 256 will revert to the ultra slow mode 258 which, for example, transmits only every 180 seconds. At any time, whether in the slow mode 252, super slow mode 256 or ultra slow mode 258, when a speed up command is received the system immediately returns to the fast mode 254. Also any time that a de-activate command is received regardless of in which mode the system is operating, fast mode 254, slow mode 252, super slow mode 256 or ultra slow mode 258 the system will return to the de-activated state 250.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A power management system for a vehicle locating unit, the vehicle locating unit having a receiver for receiving at an assigned message frame an intermittent transmission from a communications source, wherein each intermittent transmission includes at least one assignable message frame, the power management system comprising:
a processing device for controlling wake and sleep modes of the receiver; and
a memory for storing a plurality of memory bit patterns for comparison with a pattern of bits contained in some portion of an assigned message frame,
wherein the processing device is configured to perform the following steps:
index to the receiver's assigned message frame in the intermittent transmission;
re-enter wake mode after indexing; and
subject the receiver to a constant average current draw; and wherein the vehicle locating unit further comprises a transmitter for transmitting reply code and each intermittent transmission includes at least one of an activate command, a de-activate command, and a speed-up command, wherein the processing device is further configured to perform the following steps:
upon receipt of an activate command, switch said transmitter from a de-activated state to a slow mode state;
switch said transmitter from the slow mode state to a slower, second slow mode state after a predetermined period; and
upon receipt of a speed-up command, switch said transmitter from at least one of the slow mode state and the second slow mode state to a fast mode state;
switch the transmitter from the fast mode state to the slow mode state after a predetermined period;
switch the transmitter from the second slow mode state to a slower, third slow mode state after a preselected period; and
switch said transmitter from the third slow mode state to the fast mode state upon receipt of a speed-up command.

2. The system of claim 1, the processing device further configured to perform the following steps:
while in wake mode, match the pattern of bits contained in some portion of the assigned message frame with each of the plurality of memory bit patterns, and
return to sleep mode if a mismatch is detected.

3. The system of claim 1, the processing device further configured to perform the following steps:
re-enter sleep mode until an expected start of a next intermittent transmission if the expected start of the intermittent transmission is not detected.

4. The system of claim 1, wherein the processing device is further configured to perform the step of de-activate the transmitter from any of the mode states to a de-activated state upon receipt of a de-activate command.

5. The system of claim 1, the processing device further configured to perform the following steps prior to index to the receiver's assigned message frame in the intermittent transmission:
enter sleep mode until an expected start of a next intermittent transmission;
enter wake mode corresponding to an expected start of the intermittent transmission; and
after detecting the expected start of the intermittent transmission, re-enter sleep mode.

6. A power management system for a vehicle locating unit, the vehicle locating unit having a receiver for receiving at an assigned message frame an intermittent transmission from a communications source and a transmitter for transmitting reply code, wherein each intermittent transmission includes at least one assignable message frame and at least one of an activate command, a de-activate command, and a speed-up command, the power management system comprising:
a processing device for controlling wake and sleep modes of the receiver; and
a memory for storing a plurality of memory bit patterns for comparison with a pattern of bits contained in some portion of an assigned message frame,
wherein the processing device is configured to perform the following steps:
index to the receiver's assigned message frame in the intermittent transmission;
re-enter wake mode after indexing;

upon receipt of an activate command, switch the transmitter from a de-activated state to a slow mode state and switch the transmitter from the slow mode state to a slower, second slow mode state after a period of time; and upon receipt of a speed-up command, switch the transmitter from at least one of the slow mode state and the second slow mode state to a fast mode state and switch the transmitter from the fast mode state to the slow mode state after a period of time, wherein operation of the system subjects the receiver to a constant average current draw.

7. The system of claim 6, wherein the processing device is further configured to perform the steps of:

switch the transmitter from the second slow mode state to a slower, third slow mode state after a period of time; and switch the transmitter from the third slow mode state to the fast mode state upon receipt of a speed-up command.

8. The system of claim 7, wherein the processing device is further configured to perform the step of de-activate the transmitter from any of the mode states to a de-activated state upon receipt of a de-activate command.

9. The system of claim 6, the processing device further configured to perform the following steps:

while in wake mode, match the pattern of bits contained in some portion of the assigned message frame with each of the plurality of memory bit patterns, and return to sleep mode if a mismatch is detected.

10. The system of claim 6, the processing device further configured to perform the following steps:

re-enter sleep mode until an expected start of a next intermittent transmission if the expected start of the intermittent transmission is not detected.

11. The system of claim 6, the processing device further configured to perform the following steps prior to index to the receiver's assigned message frame in the intermittent transmission:

enter sleep mode until an expected start of a next intermittent transmission;

enter wake mode corresponding to an expected start of the intermittent transmission; and after detecting the expected start of the intermittent transmission, re-enter sleep mode.

12. A method of power management for a vehicle locating unit, the vehicle locating unit having a receiver for receiving at an assigned message frame from a communications source an intermittent transmission and a transmitter for transmitting reply code, wherein each intermittent transmission includes at least one assignable message frame and at least one of an activate command, a de-activate command, and a speed-up command, a processing device for controlling wake and sleep modes of the receiver; and a memory for storing a plurality of memory bit patterns for comparison with a pattern of bits contained in some portion of an assigned message frame, the method comprising the receiver:

indexing to the receiver's assigned message frame in the intermittent transmission;

re-entering wake mode after indexing;

upon receipt of an activate command, switch the transmitter from a de-activated state to a slow mode state and switch the transmitter from the slow mode state to a slower, second slow mode state after a period of time;

upon receipt of a speed-up command, switch the transmitter from at least one of the slow mode state and the second slow mode state to a fast mode state and switch the transmitter from the fast mode state to the slow mode state after a period of time; and subjecting the receiver to a constant average current draw.

13. The method of claim 12 further comprising:

the receiver re-entering sleep mode until an expected start of a next intermittent transmission if the expected start of the intermittent transmission is not detected.

14. The method of claim 12 further comprising assigning a message frame to the receiver.

15. The method of claim 12 further comprising the receiver, before indexing:

entering sleep mode until an expected start of a next intermittent transmission;

entering wake mode corresponding to an expected start of the intermittent transmission; and after detecting the expected start of the intermittent transmission, re-entering sleep mode.

16. The method of claim 12 further comprising:

while the receiver is in wake mode, matching the pattern of bits contained in some portion of the assigned message frame with each of the plurality of memory bit patterns, and returning the receiver to sleep mode if a mismatch is detected.

* * * * *